(12) United States Patent
Agarwal et al.

(10) Patent No.: US 8,249,934 B2
(45) Date of Patent: Aug. 21, 2012

(54) IMS NETWORK PROVIDING PURCHASING SESSIONS TO MOBILE DEVICES THAT ARE LOCATED PROXIMATE TO A BUSINESS

(75) Inventors: Anjana Agarwal, Wheaton, IL (US); David S. Benco, Winfield, IL (US); Byron J. Williams, Chicago, IL (US)

(73) Assignee: Alcatel Lucent, Paris (FR)

( * ) Notice: Subject to any disclaimer, the term of this patent is extended or adjusted under 35 U.S.C. 154(b) by 652 days.

(21) Appl. No.: 11/769,393

(22) Filed: Jun. 27, 2007

(65) Prior Publication Data

US 2009/0003265 A1 Jan. 1, 2009

(51) Int. Cl.
*G06Q 20/00* (2006.01)

(52) U.S. Cl. .................... 705/16; 455/456.5; 455/3.3

(58) Field of Classification Search .................. None
See application file for complete search history.

(56) References Cited

U.S. PATENT DOCUMENTS

| 5,303,393 | A  | * | 4/1994 | Noreen et al. | ............... | 455/3.02 |
| 6,628,928 | B1 | * | 9/2003 | Crosby et al. | .................. | 455/77 |
| 7,487,112 | B2 | * | 2/2009 | Barnes, Jr. | ....................... | 705/26 |
| 7,873,032 | B2 | * | 1/2011 | Silver et al. | .................. | 370/353 |
| 2004/0176081 | A1 | * | 9/2004 | Bryham et al. | ............ | 455/414.1 |
| 2005/0265276 | A1 | * | 12/2005 | Takeda et al. | .................. | 370/328 |
| 2006/0099936 | A1 | * | 5/2006 | Link et al. | .................... | 455/414.1 |
| 2006/0223556 | A1 | * | 10/2006 | Xu et al. | ......................... | 455/502 |
| 2007/0073585 | A1 | * | 3/2007 | Apple et al. | ..................... | 705/14 |
| 2007/0093258 | A1 | * | 4/2007 | Steenstra et al. | ........... | 455/456.5 |
| 2007/0136132 | A1 | * | 6/2007 | Weiser et al. | .................... | 705/14 |
| 2007/0150375 | A1 | * | 6/2007 | Yang | .............................. | 705/26 |
| 2010/0135473 | A1 | * | 6/2010 | Dewing et al. | ............. | 379/88.13 |

* cited by examiner

*Primary Examiner* — Luna Champagne
(74) *Attorney, Agent, or Firm* — Duft Bornsen & Fishman LLP

(57) ABSTRACT

IMS networks and methods are disclosed for providing purchasing sessions to mobile devices that are located proximate to a business. IMS network includes an application server that provides advertisements for the business to mobile devices that are located proximate to the business (i.e., the advertisements are pushed to the mobile devices). Responsive to an advertisement, the user of a mobile device may contact the application server through the mobile device to purchase one or more items from the business. The application server responds to the mobile device with receipt information for the purchase. The user may then request delivery of the purchased item through the mobile device by transmitting some or all of the receipt information to the application server. The application server may then schedule delivery of the item to the user of the mobile device.

16 Claims, 5 Drawing Sheets

IMS NETWORK PROVIDING PURCHASING SESSIONS TO MOBILE DEVICES THAT ARE LOCATED PROXIMATE TO A BUSINESS

BACKGROUND OF THE INVENTION

1. Field of the Invention

The invention is related to the field of communication networks and, in particular, to an IMS network that provides purchasing sessions to one or more mobile devices that are located proximate to a business. More particularly, the IMS network provides an advertisement to the mobile devices that are located proximate to the business, and then allows the mobile devices to purchase items from the business.

2. Statement of the Problem

Location-based services are services offered by some cell phone providers for sending custom advertising and other content to cell-phone subscribers based on their present location. A server in the cellular network obtains or determines the location of the cell phone, such as from a GPS signal, and then identifies content relevant to that location. The server may then send the relevant content to the cell phone, such as in the form of a text message. As an example, a cell phone subscriber may subscribe to a service that provides information on restaurants that are in the same vicinity as the subscriber.

One problem with cellular networks or other communication networks that provide location-based services is that the server in the communication network transmits the content to the user, and then the server does not have further interaction with the user. In one example, a server in the communication network may transmit a text message about restaurants to a user. The text message comprises a push of the restaurant content to the user, and the user is not allowed to further interact with the server responsive to the text message. In another example, the server in the communication network may transmit a text message containing an advertisement for a business. The text message comprises a push of the business content to the user, and the user is not allowed to further interact with the server responsive to the text message.

One type of communication network gaining popularity is an IP Multimedia Subsystem (IMS) network. As set forth in the 3$^{rd}$ Generation Partnership Project (3GPP), IMS provides a common core network having a network architecture that allows for various types of access networks. The access network between a communication device and the IMS network may be a cellular network (e.g., CDMA or GSM), a WLAN (e.g., WiFi or WiMAX), an Ethernet network, or another type of wireless or wireline access network. The IMS architecture is initially defined by the 3GPP to provide multimedia services to communication devices over an Internet Protocol (IP) network, as IP networks have become the most cost effective bearer network to transmit video, voice, and data. Service providers are accepting this architecture in next generation network evolution.

One problem with present IMS networks is that location based services have not been effectively defined or implemented in IMS networks, as may be desired.

SUMMARY OF THE SOLUTION

Embodiments of the invention solve the above and other related problems through an IMS network that provides advertisements for a business to users of mobile devices, and allows the users to purchase items from the business and request delivery of the items. The IMS network includes an application server that provides the advertisements for the business to mobile devices that are located proximate to the business (i.e., the advertisements are pushed to the mobile devices). Instead of the interaction between the application server and the users of the mobile devices ending upon transmission of the advertisement, the IMS network allows the user to further interact with the application server to purchase items from the business. For instance, the user may purchase one or more items that were included in the advertisement for the business. The IMS network may also allow the user to further interact with the application server to request delivery of the purchased item, such as delivery of the item to a pickup location for the business.

The IMS network described herein allows the business to provide targeted advertising to users that are located proximate to the business. The IMS network also provides the user of a mobile device with a convenient way of purchasing items from the business through his/her mobile device without having to enter the business and make the purchase.

One embodiment of the invention comprises an application server of an IMS network that is adapted to provide advertisements to mobile devices that are located proximate to a business. The application server receives a notification message from a location server indicating that one or more mobile devices are located proximate to the business. The application server may have previously requested that the location server provide such notification messages responsive to mobile devices coming into a defined proximity of the business. The application server identifies one or more advertisements related to the business, and initiates transmission of the advertisement or advertisements to the mobile devices that are located proximate to the business. After the advertisements are transmitted, the application server receives a purchase request message from one or more of the mobile devices to purchase an item from the business. Responsive to receiving the purchase request message from a mobile device, the application server facilitates the purchase of the item by the user of the mobile device. The application server then transmits a purchase response message to the mobile device that includes receipt information for the purchase of the item.

In another embodiment, the application server may also allow the user of the mobile device to request delivery of the purchased item. To do so, the application server receives a delivery request message from the mobile device. The application server processes the delivery request message to schedule delivery of the purchased item to the user of the mobile device. In one example, the application server may instruct an agent or employee of the business to deliver the purchased item to a pickup location of the business.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
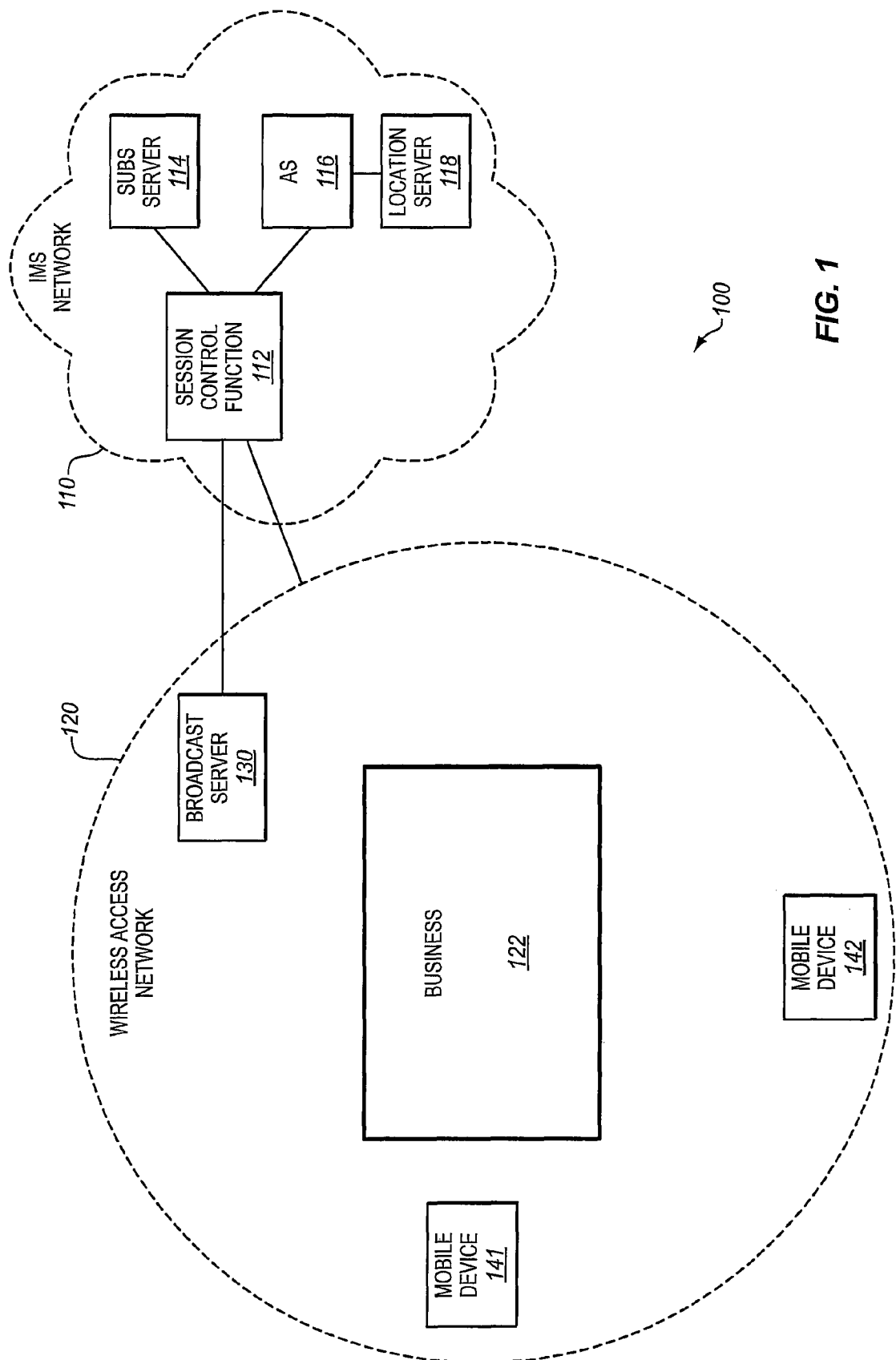
FIG. 1 illustrates a communication network in an exemplary embodiment of the invention.

FIG. 1 illustrates a communication network 100 in an exemplary embodiment of the invention. Communication network 100 includes an IMS network 110 and a wireless access network 120 connected to IMS network 110. Wireless access network 120 comprises any wireless network adapted to provide mobile or nomadic communications, such as a cellular network (e.g., a CDMA network or a UMTS network), or a Wireless Local Area Network (WLAN), such as a WiFi or WiMAX network. In this embodiment, wireless access network 120 provides a service area surrounding a business 122. The service area of the wireless access network 120 may be much larger than is illustrated in FIG. 1.

IMS network 110 includes a session control function 112, a subscriber server 114, an application server (AS) 116, and a location server 118. Session control function 112 comprises any system or server, such as a serving-call session control function (S-CSCF) that is adapted to initiate, maintain, and/or tear down sessions with IMS-compatible devices. Subscriber server 114 comprises any system or server, such as a Home Subscriber Server (HSS), that is adapted to store or maintain service profiles for users of IMS network 110. Subscriber server 114 may provide other functions, such as authentication functions. Application server 116 comprises any system or server adapted to provide particular services to mobile devices that are located in a proximity to business 122. According to the embodiments provided herein, application server 116 is adapted to provide advertisements for business 122 to mobile devices, to provide functionality to allow the mobile devices to purchase items from business 122, and to provide functionality to allow the mobile devices to request delivery of purchased items. Location server 118 comprises any system or server adapted to monitor the location of mobile devices. Although location server 118 is illustrated as being within IMS network 110, location server 118 may be owned or operated by a third party.

Application server 116 in this embodiment is associated with business 122. To be associated with business 122 means that application server 116 is owned or controlled by business 122, that the advertisements provided by application server 116 are owned or controlled by business 122, or that the function or functions performed by application server 116 are specific to business 122. Application server 116 may be shared by multiple businesses, or may belong solely to business 122. Although application server 116 is illustrated as being outside of business 122, application server 116 may be physically located in business 122 or located in another location in IMS network 110. Although application server 116 is illustrated as being within IMS network 110, application server 116 may be owned or operated by a third party.

In FIG. 1, two mobile devices 141-142 are registered with IMS network 110 and are receiving communication service through wireless access network 120. Mobile devices 141-142 are also located proximate to business 122. To be located proximate to business 122 means that mobile devices 141-142 are located within a particular range of business 122, such as one mile, one block, etc. A mobile device comprises any type of communication device capable of communicating through wireless signals for mobile or nomadic communications, such as a cell phone, a PDA, a dual-mode phone, etc. Mobile devices 141-142 may be SIP-compatible devices. Although two mobile devices 141-142 are shown, there may be many more mobile devices that are located proximate to business 122.

Figure 2:
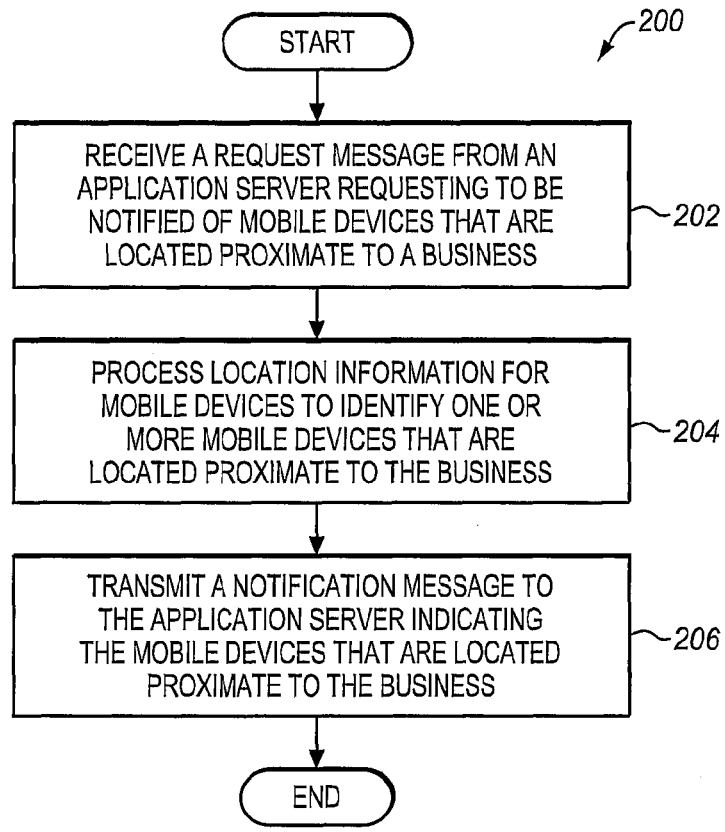
FIG. 2 is a flow chart illustrating a method of operating a location server in an exemplary embodiment of the invention.

Assume that users of mobile devices 141-142 have subscribed to a service, more particularly a location-based service that provides advertisements for business 122 and potentially other businesses. To implement the service, location server 118 monitors the locations of mobile devices 141-142. To set up the monitoring by location server 118, application server 116 may transmit a request message to location server 118 to monitor the locations of certain mobile devices that are proximate to business 122. For instance, application server 116 may transmit a SIP SUBSCRIBE message requesting to be notified of mobile devices that are located proximate to business 122. FIG. 2 illustrates the operation of location server 118 responsive to receiving the request message from application server 116.

FIG. 2 is a flow chart illustrating a method 200 of operating location server 118 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, location server 118 receives the request message from application server 116 requesting to be notified of mobile devices that are located proximate to business 122. Location server 118 then processes location information for mobile devices that are served by IMS network 110 and/or have subscribed to the service to identify one or more mobile devices, such as mobile devices 141-142, that are located proximate to business 122 in step 204. When location server 118 identifies that mobile devices 141-142 are located proximate to business 122, location server 118 transmits a notification message through the appropriate protocol to application server 116 indicating that mobile devices 141-142 are located proximate to business 122 in step 206.

Figure 3:
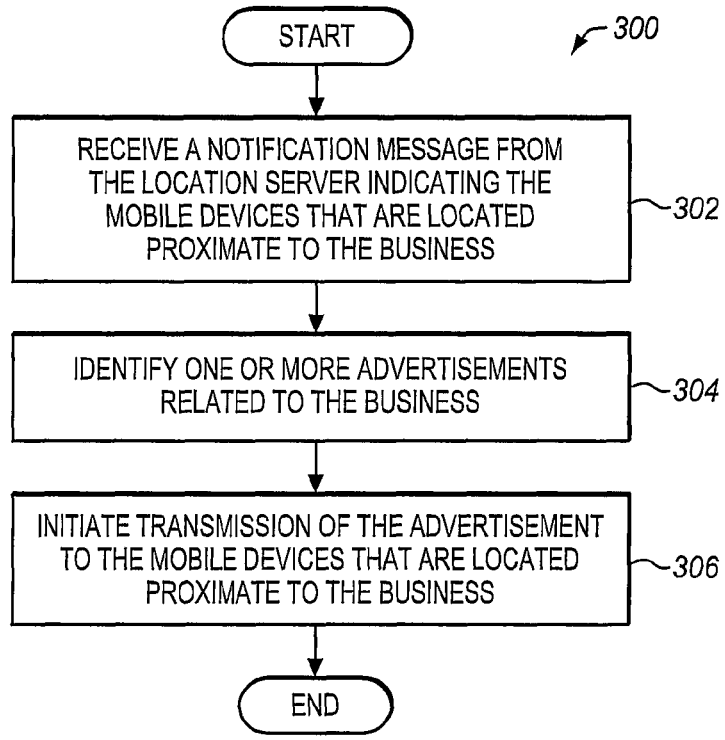
FIG. 3 is a flow chart illustrating a method of operating an application server to provide an advertisement in an exemplary embodiment of the invention.

FIG. 3 is a flow chart illustrating a method 300 of operating application server 116 to provide an advertisement in an exemplary embodiment of the invention. The steps of method 300 will be described with reference to communication network 100 in FIG. 1. The steps of the flow chart in FIG. 3 are not all inclusive and may include other steps not shown.

In step 302 of method 300, application server 116 receives the notification message from location server 118 indicating that mobile devices 141-142 are located proximate to business 122. The notification message may comprise a SIP NOTIFY message or a message of another protocol. In step 304, application server 116 identifies one or more advertisements related to business 122. An advertisement comprises any content or information related to business 122 or relating to another person, business, or entity contracting with the business 122, such as a coupon, an indication of discounts on one or more items, etc. The advertisement may comprise a general advertisement that applies to virtually any user of a mobile device, such as a sale on a particular item being sold by business 122. The advertisement may additionally or alternatively include a targeted advertisement related to a specific user of a mobile device. Application server 116 may query subscriber server 114 or another database to obtain a profile for a user of a mobile device, such as a user of mobile device 141. The profile for the user of mobile device 141 may include gender information, age, purchase history, etc. Application server 116 may then select an advertisement based on the profile for the user of mobile device 141. For example, if the user of mobile device 141 is a male between 16-24 years of age, then application server 116 may identify an advertisement related to this demographic, such as video games, electronics, sporting goods, etc. If the user of mobile device 141 has frequently purchased food items from business 122, then application server 116 may identify an advertisement related to food items.

In step 306, application server 116 initiates transmission of the advertisement or advertisements to mobile devices 141-142 that are located proximate to business 122. To initiate transmission of the advertisement, application server 116 may initiate a session with each of mobile devices 141-142. As an example, application server 116 may transmit a SIP INVITE message to mobile device 141 to initiate a session, and transmit a SIP INVITE message to mobile device 142 to initiate a session. The sessions may comprise any type of data sessions that allow for the transfer of the advertisement to mobile devices 141-142. For instance, the session may be a point-to-point video session where video may be provided to mobile devices 141-142. When the sessions are established with mobile devices 141-142, application server 116 transmits the advertisement to mobile devices 141-142. The advertisement may be in the form of a video clip, a digital picture, a text message, a multimedia message, etc.

Alternatively, to initiate transmission of the advertisement, application server 116 may transmit the advertisement and an identifier for mobile devices 141-142 to a broadcast server 130 in wireless access network 120. Broadcast server 130 may comprise a Broadcast and Multicast Service (BCMCS) server or another type of broadcast or multicast server. Broadcast server 130 is adapted to broadcast the advertisement to mobile devices 141-142 and other mobile devices not shown in FIG. 1.

Responsive to receiving the advertisement, mobile device 141 displays or otherwise provides the advertisement to a user. If the advertisement is larger than the screen on mobile device 141, then mobile device 141 provides the appropriate scrolling or next-page functions to allow the user to navigate through the advertisement. Mobile device 142 operates in a similar manner to provide the advertisement to a user.

After the advertisement is provided, IMS network 110 allows users of mobile devices 141-142 to purchase one or more items from business 122. For instance, if the advertisement includes a coupon for a clothing item, then IMS network 110 allows users of mobile devices 141-142 to purchase the clothing item. Assume that a user of mobile device 141 wants to purchase an item from business 122. The item may comprise a product or service being sold by business 122. The user of mobile device 141 may enter information into mobile device 141, may select an icon displayed on mobile device 141, or otherwise initiate the purchase of the item. Responsive to the actions of the user to initiate the purchase, mobile device 141 may initiate a purchase session with application server 116 to make the purchase. For instance, mobile device 141 may transmit a SIP INVITE message to application server 116 to initiate the purchase session. Mobile device 141 then generates a purchase request message to purchase the item. The purchase request message may comprise a SIP MESSAGE message or a message of another protocol. Mobile device 141 then transmits the purchase request message to application server 116. IMS network 110 operates as follows to allow the purchase.

Figure 4:
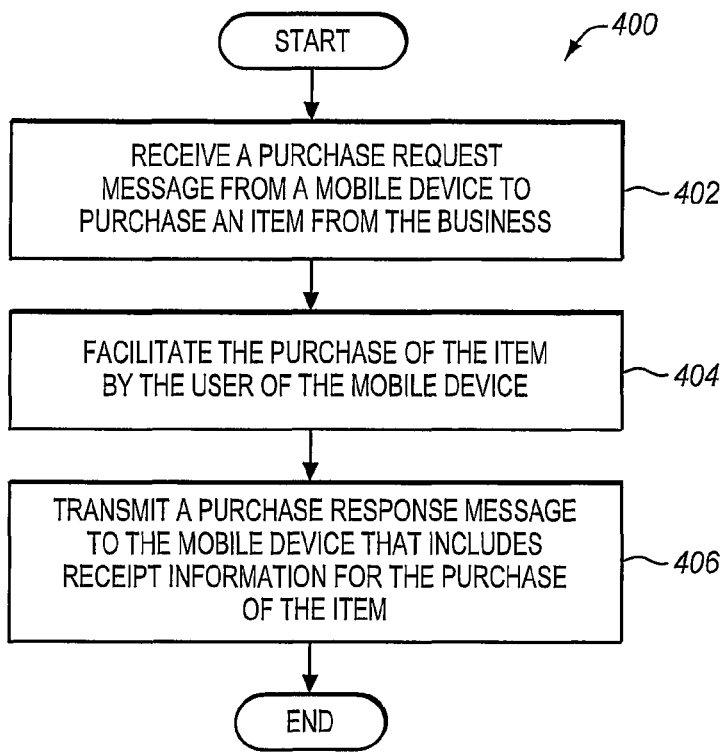
FIG. 4 is a flow chart illustrating a method of operating an application server to allow for the purchase of an item in an exemplary embodiment of the invention.

FIG. 4 is a flow chart illustrating a method 400 of operating application server 116 to allow for the purchase of an item in an exemplary embodiment of the invention. The steps of method 400 will be described with reference to communication network 100 in FIG. 1. The steps of the flow chart in FIG. 4 are not all inclusive and may include other steps not shown.

In step 402 of method 400, application server 116 receives the purchase request message from mobile device 141 to purchase the item from business 122. The purchase request message may include information needed for the purchase. For instance, the purchase request message may include an identifier for the user of mobile device 141, such as a name, a directory number, a user ID, or some other identifier. The purchase request message may also include an identifier for the item being purchased, such as a product ID, a product description, etc. The purchase request message may also include a quantity of items desired to be purchased. The purchase request message may also include information on a payment method, such as a credit card number, a debit card number, direct charge to an IMS subscriber account, etc.

In step 404, application server 116 facilitates the purchase of the item by the user of mobile device 141. In one example, application server 116 may identify a payment method for the purchase, and execute a financial transaction based on the identified payment method. If the payment method comprises a credit card, then application server 116 may execute functions to charge the credit card for the purchase, such as by contacting a server of the credit card company, Application server 116 may then generate receipt information for the purchase upon execution of the financial transaction. In another example, application server 116 may contact another server, device, or service that executes the financial transaction for the purchase, and generates the receipt information.

In step 406, application server 116 transmits a purchase response message to mobile device 141 that includes receipt information for the purchase of the item or items. The purchase request message may comprise a SIP MESSAGE message or a message of another protocol. The receipt information may include a description of the item purchased, an amount of the purchase, a date of the purchase, return information, etc. The receipt information may be encrypted so as to protect private information of the user of mobile device 141. The receipt information may be in the form of a digital picture, a text message, a multimedia message, etc. After the receipt information is provided to mobile device 141, application server 116 may tear down the session or may leave the session active.

After the purchase is complete and the receipt information is provided, IMS network 110 allows the user of mobile device 141 to request delivery of the purchased item. For instance, business 122 may have a drive up window where it is convenient for the user of mobile device 141 to drive over to business 122 and pick up the item or items just purchased. Assume that the user of mobile device 141 wants to request delivery of the item or items just purchased from business 122. The user of mobile device 141 may enter information into mobile device 141, may select an icon displayed on mobile device 141, or otherwise request delivery of the item. Responsive to the actions of the user to request delivery, mobile device 141 may initiate a delivery session with application server 116 if the prior purchase session was torn down, or may continue with the purchase session. Mobile device 141 then generates a delivery request message to request delivery of the purchased item. The delivery request message may comprise a SIP MESSAGE message or a message of another protocol. Mobile device 141 then transmits the delivery request message to application server 116. IMS network 110 operates as follows to provide for delivery of the purchased item.

Figure 5:
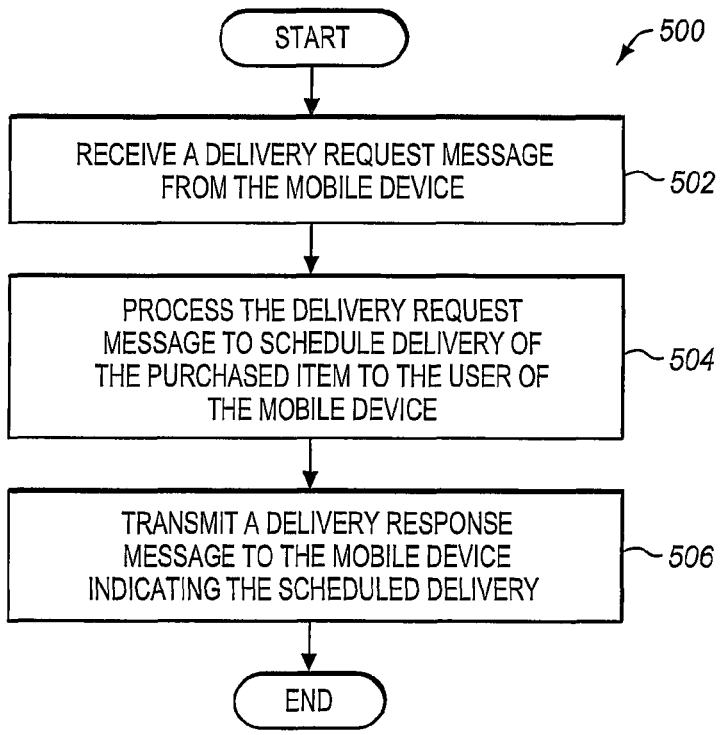
FIG. 5 is a flow chart illustrating a method of operating an application server to request delivery of a purchased item in an exemplary embodiment of the invention.

FIG. 5 is a flow chart illustrating a method 500 of operating application server 116 to request delivery of a purchased item in an exemplary embodiment of the invention. The steps of method 500 will be described with reference to communication network 100 in FIG. 1. The steps of the flow chart in FIG. 5 are not all inclusive and may include other steps not shown.

In step 502 of method 500, application server 116 receives the delivery request message from mobile device 141. The delivery request message includes some or all of the receipt information that was previously provided in the purchase response message. In step 504, application server 116 processes the delivery request message to schedule delivery of the purchased item to the user of mobile device 141. In one example, application server 116 may interact with an inventory program for business 122 that maintains the inventory for business 122 and schedules deliveries of purchased items. Application server 116 may then instruct the inventory program to schedule delivery of the purchased item to the user of mobile device 141. The delivery may be to a residence of the user of mobile device 141. The delivery may alternatively be to a pick up location in business 122, such as a pick up window.

In step 506, application server 116 transmits a delivery response message to mobile device 141 indicating the scheduled delivery. If the delivery is to a pickup location of business 122, then the delivery response message indicates that delivery is to the pickup location and may include directions to the pickup location and/or instructions for the pickup.

Although application server 116 is illustrated as performing all three functions of providing advertisements, providing purchasing sessions, and providing for delivery of purchased items, those skilled in the art understand that such functions may be performed by multiple application servers.

IMS network 110 provides a convenient way for business 122 to transmit advertising to mobile users that are in the vicinity of business 122. This type of advertising may spark impulse buying that is desired by business 122. IMS network 110 also provides a convenient way for mobile users to be notified of coupons, discounts, sales, etc, of business 122, and to purchase items from the business. A mobile user could purchase an item and schedule delivery of the item without having to physically enter business 122.

Example

Figure 6:
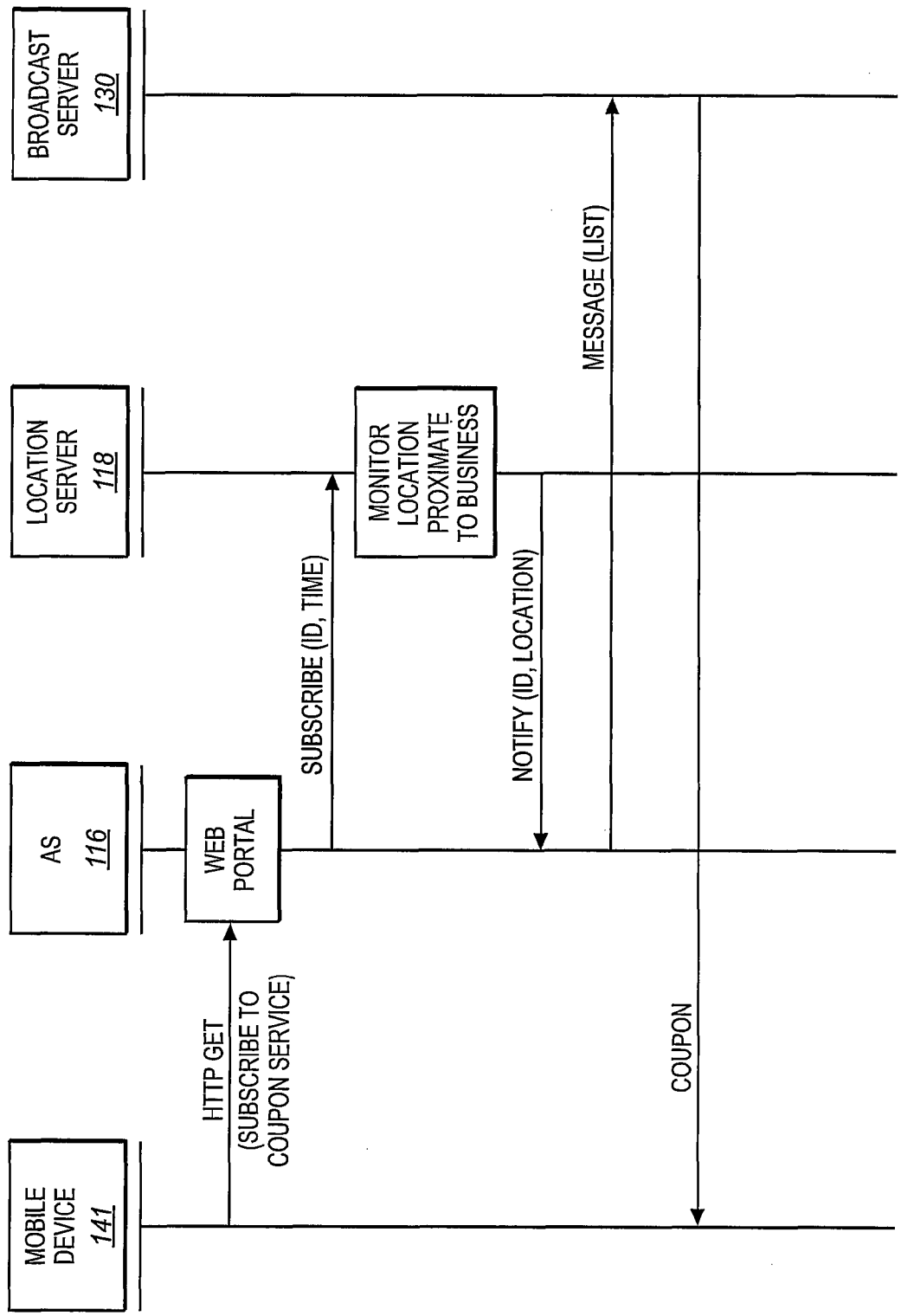
FIG. 6 is a message diagram illustrating the messaging used to provide an advertisement to mobile devices that are located proximate to a business in an exemplary embodiment of the invention.

The following illustrates an example of operating IMS network 110 to allow users of mobile devices to purchase items from business 122. FIG. 6 is a message diagram illustrating the messaging used to provide an advertisement to mobile devices that are located proximate to business 122 in an exemplary embodiment of the invention. The messaging used in this example is SIP, but other messaging protocols may be used in other embodiments. To begin, a user of mobile device 141 signs up to receive a coupon service from business 122 through a web portal provided by application server 116, such as by transmitting an HTTP GET message to application server 116. The user of mobile device 141 may sign up using mobile device 141 or another web-enabled device, such as a computer. Responsive to the user of mobile device 141 signing up for the coupon service, application server 116 transmits a SIP SUBSCRIBE message to location server 118 requesting to be notified if mobile device 141 (or other mobile devices) is located proximate to business 122. Application server 116 may include a identifier for mobile device 141, such as a directory number, and may include a time during which application server 116 desires to be notified, such as during normal business hours of business 122.

A user of mobile device 142 and users of other mobile devices may act in a similar manner to subscribe to the coupon service. Application server 116 may transmit a SIP SUBSCRIBE message to location server 118 for each mobile user that has subscribed to the coupon service.

Location server 118 then processes location information for mobile device 141 to identify if mobile device 141 is located proximate to business 122. When location server 118 identifies that mobile device 141 is located proximate to business 122, location server 118 transmits a SIP NOTIFY message to application server 116. Location server 118 may also transmit other NOTIFY messages to application server 116 indicating that other mobile devices, such as mobile device 142, are now located proximate to business.

Responsive to receiving one or more NOTIFY messages from location server 118, application server 116 identifies one or more advertisements related to business 122. The advertisement may comprise a general advertisement that applies to virtually any user of a mobile device, such as a sale on a particular item being sold by business 122. The advertisement may additionally or alternatively include a targeted advertisement related to a specific user of a mobile device. Application server 116 then generates a broadcast list based on the identities of the mobile devices 141-142 that are located proximate to business 122. Application server 116 then transmits a SIP MESSAGE message to broadcast server 130 indicating the broadcast list and the advertisement to be delivered to the mobile devices on the broadcast list. Responsive to receiving the SIP MESSAGE message, broadcast server 130 broadcasts the advertisement to the mobile devices on the broadcast list, such as mobile devices 141-142.

Responsive to receiving the advertisement, mobile device 141 displays or otherwise provides the advertisement to a user. Mobile device 142 operates in a similar manner to provide the advertisement to a user. After the advertisement is provided, IMS network 110 allows users of mobile devices 141-142 to purchase one or more items from business 122. For instance, if the advertisement includes a coupon for a clothing item, then IMS network 110 allows users of mobile devices 141-142 to purchase the clothing item. Assume that a user of mobile device 141 wants to purchase an item from business 122. The user of mobile device 141 may enter information into mobile device 141, may select an icon displayed on mobile device 141, or otherwise initiate the purchase of the item.

Figure 7:
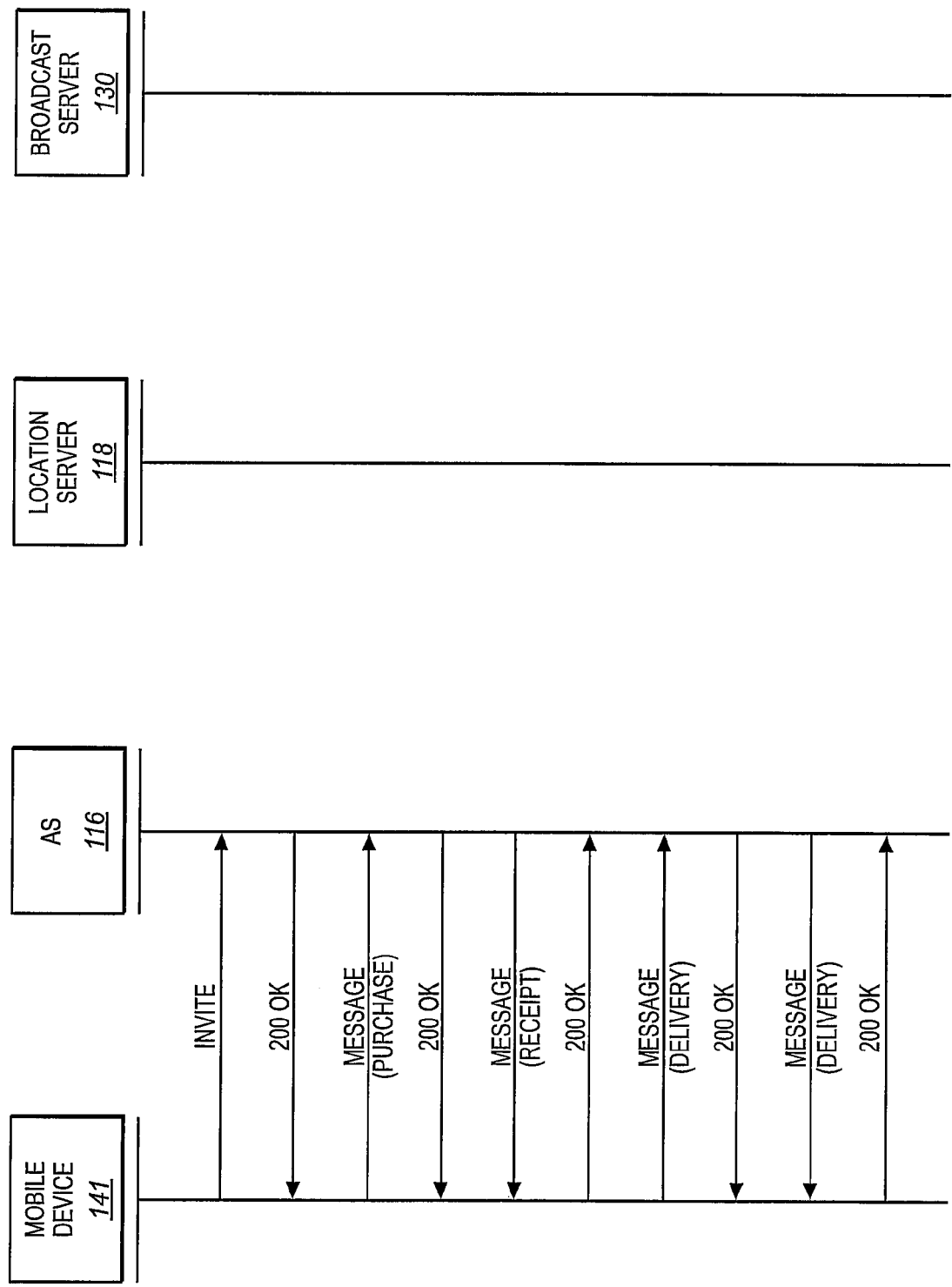
FIG. 7 is a message diagram illustrating the messaging used to purchase an item from a business in an exemplary embodiment of the invention.

FIG. 7 is a message diagram illustrating the messaging used to purchase an item from business 122 in an exemplary embodiment of the invention. Responsive to the actions of the user of mobile device 141 to initiate the purchase, mobile device 141 transmits a SIP INVITE message to application server 116 to initiate the purchase session. Application server 116 responds to the INVITE message with a SIP 200 OK message to establish the purchase session. Mobile device 141 then generates a SIP MESSAGE message (Purchase) to purchase the item, and transmits the SIP MESSAGE message (Purchase) to application server 116. Application server 116 responds to the SIP MESSAGE message (Purchase) to purchase the item with a SIP 200 OK message. Application server 116 also facilitates the purchase of the item, such as by executing financial transaction based on a payment method indicated in the SIP MESSAGE message (Purchase). Application server 116 then transmits a SIP MESSAGE message (Receipt) that includes receipt information for the purchase of the item. The receipt information may include a description of the item purchased, an amount of the purchase, a date of the purchase, return information, etc. Mobile device 141 responds to the SIP MESSAGE message (Receipt) with a SIP 200 OK message. Mobile device 141 also displays the receipt information to the user.

After the purchase is complete and the receipt information is provided, IMS network 110 allows the user of mobile device 141 to request delivery of the purchased item. For instance, assume that business 122 has a drive up window where it is convenient for the user of mobile device 141 to drive over to business 122 and pick up the item or items just purchased. To request delivery of the purchased item, the user of mobile device 141 may select a receipt icon or otherwise enter commands to request delivery. Responsive to the commands of the user, mobile device 141 transmits a SIP MESSAGE message (Delivery) to application server 116 requesting delivery of the purchased item. The SIP MESSAGE message (Delivery) includes some or all of the receipt information that was previously provided to mobile device 141. Application server 116 responds to the SIP MESSAGE message (Delivery) with a SIP 200 OK message. Application server 116 then processes the SIP MESSAGE message (Delivery) to schedule delivery of the purchased item to the user of mobile device 141. For instance, the scheduled delivery may include instructing an employee of business 122 to deliver the purchased item to the pickup window for business 122.

Application server 116 then transmits a SIP MESSAGE message (Delivery) to mobile device 141 indicating the scheduled delivery. Mobile device 141 responds with a SIP 200 OK message. The SIP MESSAGE message (Delivery) indicates that delivery is to the pickup location for business 122 and may include directions to the pickup location and/or instructions for the pickup. The user of mobile device 141 may then drive to the pickup window of business 122 to pick up the purchased item.

Although specific embodiments were described herein, the scope of the invention is not limited to those specific embodiments. The scope of the invention is defined by the following claims and any equivalents thereof.

We claim:

1. A system comprising:
   an application server of an IP Multimedia Subsystem (IMS) network, wherein the application server is associated with a business;
   the application server is adapted to receive a notification message from a location server indicating that a mobile device is located proximate to the business, to identify an advertisement related to the business, and to initiate transmission of the advertisement to the mobile device that is located proximate to the business;
   the application server is further adapted to receive a Session Initiation Protocol (SIP) request from the mobile device to initiate an interactive purchase session between the mobile device and the application server responsive to a user of the mobile device selecting an icon associated with the advertisement;
   with the interactive purchase session established, the application server is further adapted to receive a purchase request from the mobile device to purchase an item from the business that was included in the advertisement, to facilitate the purchase of the item requested by the user of the mobile device based on payment information included with the purchase request, and to transmit a purchase response to the mobile device that includes receipt information for the purchase of the item; and
   the application server is further adapted to tear down the interactive purchase session after providing the receipt information to the mobile device.

2. The system of claim 1 wherein the application server is further adapted to:
   receive a delivery request in a SIP MESSAGE from the mobile device that includes the receipt information; and
   process the receipt information from the SIP MESSAGE to schedule delivery of the item to the user of the mobile device.

3. The system of claim 2 wherein the application server is further adapted to:
   instruct an agent of the business to deliver the purchased item to a pickup location of the business.

4. The system of claim 1 further comprising the location server adapted to:
   receive a request message from the application server requesting to be notified of mobile devices that are located proximate to the business;
   process location information for the mobile devices that are served by the IMS network to identify the mobile devices that are located proximate to the business; and
   transmit the notification message to the application server indicating that the mobile device is located proximate to the business.

5. The system of claim 4 wherein:
   the request message from the application server comprises a SIP SUBSCRIBE message; and
   the notification message from the location server comprises a SIP NOTIFY message.

6. The system of claim 1 wherein the advertisement comprises a coupon for the item purchased by the user.

7. The system of claim 1 wherein the application server is further adapted to:
   identify a payment method for the purchase;
   execute a financial transaction based on the identified payment method; and
   generate the receipt information for the purchase upon execution of the financial transaction.

8. The system of claim 1 wherein the notification message from the location server indicates that a plurality of mobile devices are located proximate to the business, and wherein the application server is further adapted to:
   transmit the advertisement and an indication of the plurality of the mobile devices that are located proximate to the business to a broadcast server to allow the broadcast server to broadcast the advertisement to the plurality of mobile devices.

9. A method comprising:
   receiving a notification message in an application server of an IP Multimedia Subsystem (IMS) network from a location server wherein the notification message indicates that a mobile device is located proximate to the business;
   identifying an advertisement related to the business;
   initiating transmission of the advertisement from the application server to the mobile device that is located proximate to the business;
   receiving a Session Initiation Protocol (SIP) request in the application server from the mobile device to initiate an interactive purchase session between the mobile device and the application server responsive to a user of the mobile device selecting an icon associated with the advertisement;

with the interactive purchase session established, the method further comprises:

receiving a purchase request in the application server from the mobile device to purchase an item from the business that was included in the advertisement;

facilitating the purchase of the item requested by a user of the mobile device through the application server based on payment information included with the purchase request;

transmitting a purchase response from the application server to the mobile device that includes receipt information for the purchase of the item; and tearing down the interactive purchase session after providing the receipt information to the mobile device.

10. The method of claim 9 further comprising:

receiving a delivery request in a SIP MESSAGE in the application server from the mobile device that includes the receipt information; and processing the receipt information from the SIP MESSAGE to schedule delivery of the item to the user of the mobile device.

11. The method of claim 10 wherein processing the delivery request message to schedule delivery of the item to the user of the mobile device comprises:

instructing an agent of the business to deliver the purchased item to a pickup location of the business.

12. The method of claim 9 further comprising:

receiving a request message in the location server from the application server requesting to be notified of mobile devices that are located proximate to the business;

processing location information for the mobile devices in the location server that are served by the IMS network to identify the mobile devices that are located proximate to the business; and transmitting the notification message from the location server to the application server indicating that the mobile device is located proximate to the business.

13. The method of claim 12 wherein:

the request message from the application server comprises a SIP SUBSCRIBE message; and the notification message from the location server comprises a SIP NOTIFY message.

14. The method of claim 9 wherein the advertisement comprises a coupon for the item purchased by the user.

15. The method of claim 9 further comprising:

identifying a payment method for the purchase;

executing a financial transaction based on the identified payment method; and generating the receipt information for the purchase upon execution of the financial transaction.

16. The method of claim 9 wherein the notification message from the location server indicates that a plurality of mobile devices is located proximate to the business, and wherein the method further comprises:

transmitting the advertisement and an indication of the plurality of the mobile devices that are located proximate to the business to a broadcast server to allow the broadcast server to broadcast the advertisement to the plurality of mobile devices.

* * * * *